Patented Jan. 13, 1931

1,788,739

UNITED STATES PATENT OFFICE

ARTHUR MAURICE PEAKE, OF LONDON, ENGLAND, ASSIGNOR TO COMMERCIAL SOLVENTS CORPORATION, OF TERRE HAUTE, INDIANA, A CORPORATION OF MARYLAND

PRODUCTION OF CITRIC ACID

No Drawing. Application filed November 25, 1927, Serial No. 235,748, and in Great Britain November 27, 1926.

This invention relates to the production of organic acids, particularly citric acid, and has for its chief object to provide a simple and efficient process of production from inexpensive and readily obtainable raw materials.

It is now generally accepted that the organic acids that are present in the fruits of various plants or trees are built up during the growth of the fruit by enzymes existing in the growing plant, but as far as I am aware no attempt has been made to utilize the action of these enzymes on substance outside of or apart from the plants themselves, and it is such use that characterizes the present invention.

While investigating the production of citric acid during the growth of citrus fruits, I have found that this acid is formed from pectinous or other similar substances by enzymic action during ripening, and the present invention in its broad aspect may be said to consist in a process of manufacturing organic acids, particularly citric acid, from suitable raw material such as fruit pulp, wood dextrins, gums and similar pectinous bodies by enzymic action. Under certain conditions the enzymes of the citrus fruits may first be removed and then be made to react upon extraneous substances or they may be used as found embodied in the fruit provided the essential oils be first removed.

The enzymes that build up citric acid in citrus fruits occur principally in the pith which lies between the pulp of the fruit and the outer layer of the rind, which layer contains the essential oils. Hence either the rind itself, after removal of the oil containing layer, may be used as the converting agent, or the enzyme may be extracted from the pith in any suitable manner, for example by means of a weak solution of an organic acid, and then this extract may be employed. Care must be taken, if the pith is used, that all the essential oil has been removed first, as the essential oils have an inhibiting effect on the citric-producing enzyme, but this removal is easy of attainment as all the oil cells are situated at the outer surface of the rind. On the other hand, it is immaterial whether a little pulp is left adhering to the pith or not. The enzymes which produce citric acid are present in all the citrus fruits, lemons, limes, bergamots, oranges etc. but are present in larger amount and in a more active form in unripe lemons, unripe bitter oranges, and the last named fruits are the most suitable for obtaining them.

The raw material for conversion may be mashes of pectinous bodies such as apple pulp, plum pulp, solutions of gums such as cherry gum or of wood dextrins such as are obtained in the hydrolysis of wood by concentrated acids. Certain sugars may also be used as raw material.

It is perferable that the initial reaction should take place in a slightly acid medium and small amounts of an organic acid, for example citric acid, may be added to the mash in those cases where this has not already an acid reaction.

As the reaction proceeds the hydogen-ion concentration may, if desired, be maintained within suitable limits by the addition of calcium carbonate but this is not required since the action of the enzyme is not inhibited by concentrations of acid, in the mash, of less than 10–12%, which is a greater concentration than is ordinarily obtained.

The addition of small amounts of oxygen-carrying catalysts such as manganese salts or titanium salts is beneficial although they must not be present in large enough quantities to inhibit the activity of the enzyme. Iron salts are not as suitable as manganese or titanium salts as oxygen carriers.

The following examples illustrate the manner in which the invention may be carried into practice:—

*Example I.*—A mash containing 10 per cent of pectinous material is prepared or taken and to each litre of the mash are added 0.5 per cent of lemon pith (containing the enzyme) 1 per cent of citric acid, and 0.005 grams of manganese sulphate. An ordinary or slightly increased temperature for example 25° C. to 35° C., is maintained and moderate aeration is advantageous. Enzymatic action will proceed and a yield of citric acid equal to at least 80% of the raw material undergoing treatment will result.

*Example II.*—An aqueous solution or suspension containing approximately 10% pectin, gum or wood dextrin obtained by the acid hydrolysis of cellulose is prepared in any known manner. To each litre of this are added 0.5% of unripe bitter orange peel from which the essential oil has been removed, and .001% of manganese sulphate. If the solution has not already an acid reaction, 2% of citric acid is added. A gentle current of air is then passed through. After 3 to 4 days the bulk of the pectin or dextrin will be found to have been converted into citric acid, which can be separated and recovered in any known manner, for example, by precipitation as citrate of lime by means of calcium carbonate.

If the raw material taken is already acid as when an acid fruit pulp like apple pulp is the starting point, the further addition of citric acid is unnecessary.

*Example III.*—This example is to illustrate how the process of the present invention may be applied to increase the amount of citric acid already present in citrus fruits.

Lemon juice and pulp containing say 70 grams per litre of citric acid and 17 grams per litre of sugar can be allowed to ferment spontaneously or by the addition of yeasts which develop in presence of citric acid. After 2-3 days sugar will have disappeared and the alcohol formed can be distilled off. Instead of precipitating the citric acid from the residue left after distillation, as has heretofore been customary, it can be treated with about 0.5% of pith and a small amount of an oxygen carrying salt and aerated for 2-3 days. The citric acid content will thereby be increased from 70 to about 85 grams per litre owing to the action of the enzyme on the pectins still contained in the lemon mash. The further treatment of the juice can then be carried out in the usual manner.

In all cases it is desirable that the reaction should take place under aseptic conditions. The air used for aeration should therefore be sterile. It may also be necessary to sterilize some raw materials before inoculation with the enzyme, particularly if the materials used have been subjected to conditions likely to lead to their infection by organisms that, like the organisms producing butyric acid, have a prejudicial effect on the citric-producing enzymes. Such sterilization may be effected by boiling, or the growth of bacteria may be inhibited by the addition of substances such as chloroform, toluene, etc. which prevent the development of bacteria but which do not inhibit the action of the enzyme.

As a general rule freshly prepared raw materials such as fresh fruit pulp etc. can be used without preliminary sterilization.

As already indicated, in place of the pith itself an extract obtained by triturating the pith with 5% citric acid in presence of clean sand and filtering may be used.

Having now particularly described and ascertained the nature of my said invention and in what manner the same is to be performed, I declare that what I claim is:—

1. In the production of citric acid the step which comprises adding the enzymes of citrous fruits, apart from their essential oils, to solutions or suspensions of pectinous materials.

2. In the production of citric acid the step which comprises adding the active enzymes of citrous fruits in the absence of their essential oils to solutions or suspensions of materials selected from the group consisting of fruit pulp, wood dextrins, gums, and similar pectinous bodies.

3. In the production of citric acid the step which comprises adding the active enzymes of citrous fruits in the absence of their essential oils to solutions or suspensions of materials selected from the group consisting of fruit pulp, wood dextrins, gums, and similar pectinous bodies, the active enzyme being used in the form of the pith of fresh citrous fruit devoid of essential oils.

4. In the production of citric acid the step which comprises adding the active enzyme of citrous fruits in the absence of their essential oils to solutions or suspensions of materials selected from the group consisting of fruit pulp, wood dextrins, gums, and similar pectinous bodies, the active enzyme being used in the form of the pith of fresh, unripe citrous fruit devoid of essential oils.

5. In the production of citric acid the steps which comprise adding the enzymes of citrous fruits, apart from their essential oils, to solutions or suspensions of materials selected from the group consisting of fruit pulp, wood dextrins, gums, and similar pectinous bodies, the said reaction being assisted by the presence of an oxygen-carrying catalyst.

6. In the production of citric acid the steps which comprise adding the enzymes of citrous fruits, apart from their essential oils, to solutions or suspensions of materials selected from the group consisting of fruit pulp, wood dextrins, gums, and similar pectinous bodies, the said reaction being assisted by the presence of manganese sulphate.

7. In the production of citric acid the step which comprises adding the active enzymes of citrous fruits in the absence of their essential oils to solutions or suspensions of materials selected from the group consisting of fruit pulp, wood dextrins, gums, and similar pectinous bodies, the active enzyme being used in the form of an extract of the pith of fresh citrous fruit devoid of essential oils.

8. The method of producing citric acid which consists in preparing a mash containing about 10% of pectinous material, adding to each liter thereof about 0.5% of citrous fruit pith free from essential oils, adding sufficient citric acid to make the mash slightly acid, and a small amount of an oxygen-containing catalyst, and allowing fermentation to take place at a temperature of 25° to 35° C. while aerating the mash substantially as described.

9. The method of producing citric acid which consists in preparing a mash containing about 10% of pectinous material, adding to each liter thereof about 0.5% of citrous fruit pith free from essential oils, and a small amount of an oxygen-containing catalyst, and allowing fermentation to take place at a temperature of 25° to 35° C. while aerating the mash substantially as described.

10. The method of producing citric acid which consists in preparing a mash containing about 10% of material selected from the group consisting of fruit pulp, wood dextrins, gums, or similar pectinous bodies, adding to each liter thereof about 0.5% of citrous fruit pith free from essential oils, adding sufficient citric acid to make the mash slightly acid, and a small amount of an oxygen-containing catalyst, and allowing fermentation to take place at a temperature of 25° to 35° C. while aerating the mash substantially as described.

11. The method of producing citric acid which consists in preparing a mash containing about 10% of material selected from the group consisting of fruit pulp, wood dextrins, gums, or similar pectinous bodies, adding to each liter thereof about 0.5% of lemon pith free from essential oils, adding sufficient citric acid to make the mash slightly acid, and a small amount of an oxygen-containing catalyst, and allowing fermentation to take place at a temperature of 25° to 35° C. while aerating the mash substantially as described.

12. The method of producing citric acid which consists in preparing a mash containing about 10% of material selected from the group consisting of fruit pulp, wood dextrins, gums, or similar pectinous bodies, adding to each liter thereof about 0.5% of unripe lemon pith free from essential oils, adding sufficient citric acid to make the mash slightly acid, and a small amount of an oxygen-containing catalyst, and allowing fermentation to take place at a temperature of 25° to 35° C. while aerating the mash substantially as described.

13. The method of producing citric acid which consists in preparing a mash containing about 10% of material selected from the group consisting of fruit pulp, wood dextrins, gums, or similar pectinous bodies, adding to said mash a suitable amount of an extract of the pith of fresh citrous fruit devoid of essential oils, adding sufficient citric acid to make the mash slightly acid, and a small amount of an oxygen-containing catalyst, and allowing fermentation to take place at a temperature of 25° to 35° C. while aerating the mash substantially as described.

14. The method of producing citric acid which consists in preparing a mash containing pectinous material, adding to said mash citrous fruit pith free from essential oils, adding sufficient citric acid to make the mash slightly acid and a small amount of an oxygen-containing catalyst, and allowing fermentation to take place at a temperature of 25° to 35° C. while aerating the mash substantially as described.

In testimony whereof I affix my signature.

ARTHUR M. PEAKE.